US012601360B2

(12) United States Patent
De Mourgues et al.

(10) Patent No.: US 12,601,360 B2
(45) Date of Patent: Apr. 14, 2026

(54) ELECTRIC PUMP ASSEMBLY, MANUFACTURING METHOD FOR INSTALLING SUCH A PUMP ASSEMBLY

(71) Applicant: OPTIMEX, Fleurieux-sur-l'arbresle (FR)

(72) Inventors: Pierre-Marc De Mourgues, Lentilly (FR); Guillaume Pierre-Marie Michel Spruyte, Lentilly (FR)

(73) Assignee: OPTIMEX, Fleurieux-sur-l'Arbresle (FR)

( * ) Notice: Subject to any disclaimer, the term of this patent is extended or adjusted under 35 U.S.C. 154(b) by 62 days.

(21) Appl. No.: 18/688,501

(22) PCT Filed: Sep. 2, 2022

(86) PCT No.: PCT/FR2022/051658
§ 371 (c)(1),
(2) Date: Mar. 1, 2024

(87) PCT Pub. No.: WO2023/031566
PCT Pub. Date: Mar. 9, 2023

(65) Prior Publication Data
US 2024/0384725 A1      Nov. 21, 2024

(30) Foreign Application Priority Data

Sep. 3, 2021     (FR) ...................................... 2109238

(51) Int. Cl.
*F04D 29/08*          (2006.01)
*B29D 23/00*          (2006.01)
(Continued)

(52) U.S. Cl.
CPC ........... *F04D 29/086* (2013.01); *B29D 23/00* (2013.01); *F04D 13/0626* (2013.01);
(Continued)

(58) Field of Classification Search
CPC .... F04D 1/06; F04D 13/0606; F04D 13/0626; F04D 29/086; F04D 29/5806; H02K 5/128; H02K 5/1285
(Continued)

(56) References Cited

U.S. PATENT DOCUMENTS

| | | | |
|---|---|---|---|
| 2012/0146440 A1* | 6/2012 | D'Antonio | .......... F04D 13/0633 |
| | | | 310/86 |
| 2013/0224048 A1* | 8/2013 | Gillingwater | .......... H02K 5/128 |
| | | | 417/372 |
| 2015/0143822 A1 | 5/2015 | Chalmers et al. | |

FOREIGN PATENT DOCUMENTS

| | | |
|---|---|---|
| BE | 62160 | 2/1963 |
| CN | 108194430 A | 6/2018 |

(Continued)

OTHER PUBLICATIONS

"Spaltrohrmotor"; Wikipedia; Feb. 6, 2019.

*Primary Examiner* — Kenneth J Hansen
(74) *Attorney, Agent, or Firm* — Nath, Goldberg & Meyer; Joshua B. Goldberg

(57)          ABSTRACT

A pump assembly (1) includes a pump (2) and an electric motor (30 comprising a stator (4) and a rotor (5) separated by a gap. The pump assembly has a casing (6) defining a housing accommodating the stator (4) and rotor (5) with a removable seal jacket (12) that is designed to move from a test configuration where the seal jacket (12) is removably mounted within the casing (6), in the gap, to a normal operating configuration, where the seal jacket (12) is removed from the casing (6) to form a wet stator arrangement. Methods of manufacturing and installing the pump assembly are also disclosed.

15 Claims, 6 Drawing Sheets

(51) Int. Cl.

| | |
|---|---|
| *F04D 7/02* | (2006.01) |
| *F04D 13/06* | (2006.01) |
| *F04D 29/02* | (2006.01) |
| *F04D 29/58* | (2006.01) |
| *F04D 29/62* | (2006.01) |

(52) U.S. Cl.
CPC ....... *F04D 29/026* (2013.01); *F04D 29/5806* (2013.01); *F04D 29/628* (2013.01); *F04D 7/02* (2013.01)

(58) Field of Classification Search
USPC ..................................................... 310/86–88
See application file for complete search history.

(56) References Cited

FOREIGN PATENT DOCUMENTS

| | | |
|---|---|---|
| CN | 111779678 A | 10/2020 |
| DE | 2838200 A1 | 3/1980 |

* cited by examiner

ELECTRIC PUMP ASSEMBLY, MANUFACTURING METHOD FOR INSTALLING SUCH A PUMP ASSEMBLY

This is a National Phase Application filed under 35 U.S.C. 371 as a national stage of PCT/FR2022/051658, filed Sep. 2, 2022, an application claiming the benefit of French Application No. 2109238, filed Sep. 3, 2021, the content of each of which is hereby incorporated by reference in its entirety.

TECHNICAL FIELD

The present invention relates to the general technical field of hydraulic machines driven by electric motors, and more particularly to the field of electric pump assemblies, intended in particular for pumping liquefied petroleum gases.

The present invention more particularly relates to a pump assembly for pumping fluids, including a pump and an electric motor to drive the pump, said motor comprising a stator and a rotor separated by a gap, said pump assembly also including a casing delimiting a housing accommodating said stator and rotor, said housing being in fluid communication with the pump to circulate the pumped fluid in said housing in order to cool said motor.

The present invention also relates to a method for manufacturing a pump assembly, as well as a method for installing a pump assembly.

PRIOR ART

Industrial submerged-rotor pump assemblies are well known and are able to pump liquids efficiently while ensuring effective cooling of the electric motor that drive the pump thanks to immersion of the rotor of said motor in the pumped liquid. The submerged-rotor design has for advantage to contain the pumped liquid inside the electric motor, thus eliminating the need to implement dynamic shaft seal. More precisely, the submerged-rotor pump assembly family includes the so-called "wet-stator" pump assemblies, designed in particular for pumping liquefied petroleum gases such as methane, ethane or propane. In such wet-stator hydraulic machines, the electric motor stator is designed to be immersed in the pumped liquid, just like the rotor, to cool the motor. Of course, the nature of the pumped liquid must be compatible with such a wet-stator design, i.e. in this case the pumped liquid must not be electrically conductive and must not be chemically aggressive to the point of destroying stator components. Liquefied petroleum gases such as methane, ethane or propane, generally meet these requirements. The use of a submerged-rotor pump assembly based on a wet-stator design enables to reduce maintenance and risks of leakage, and to ensure a high degree of safety, particularly when pumping liquefied petroleum gases, while benefiting from a simplified construction with a minimum number of internal seal parts.

Such known wet-stator hydraulic machines nevertheless have serious drawbacks. Indeed, such wet-stator hydraulic machines must, as any hydraulic machine, undergo tests and trials before being put into service, to ensure their performance and conformity. These tests have to be carried out on extremely complex and expensive test benches, operating at cryogenic temperature with flammable liquefied petroleum gases. This makes the pre-test procedure for known wet-stator hydraulic machines itself complex and expensive, especially as there are only very few suitable test benches in the world.

DISCLOSURE OF THE INVENTION

The objects assigned to the invention therefore aim to remedy the above-mentioned drawbacks and to propose a new pump assembly that, while being of simple, lightweight, compact and economical construction, has a design that enables pre-testing to be carried out simply, quickly and cost-effectively, without the need for complex and expensive test benches.

Another object of the invention aims to propose a new pump assembly whose design enables pre-commissioning tests and trials to be carried out that are faithfully representative of normal operation.

Another object of the invention aims to propose a new particularly reliable pump assembly.

Another object of the invention aims to propose a new pump assembly that implements a small number of simple components.

Another object of the invention aims to propose a new pump assembly that is quick and easy to inspect and maintain.

Another object of the invention aims to propose a new pump assembly with controlled weight, as well as a high level of safety and robustness.

Another object of the invention aims to propose a new pump assembly, whose design lends itself particularly well to industrial manufacturing.

Another object of the invention aims to propose a new pump assembly, the use, installation and implantation of which are quick and easy to implement.

Another object of the invention aims to propose a new method for manufacturing a pump assembly that provides high manufacturing precision, while being particularly simple and easy to industrialize.

Another object of the invention aims to propose a new method for installing a pump assembly that is easy, quick and inexpensive to implement, and that does not require the use of a complex and expensive test bench.

The objects assigned to the invention are achieved by means of a pump assembly for pumping fluids, including a pump and an electric motor to drive the pump, said motor comprising a stator and a rotor separated by a gap, said pump assembly also including a casing delimiting a housing accommodating said stator and rotor, said housing being in fluid communication with the pump to circulate the pumped fluid in said housing in order to cool said motor, said pump assembly being characterized in that it comprises a removable seal jacket made of an electrically non-conductive material, and in that it is designed to switch from a test configuration, in which said seal jacket is removably mounted within the casing, in the gap, to isolate said stator from said pumped fluid, to a normal operating configuration, for pumping electrically non-conductive fluids, wherein the seal jacket is removed from the casing, so as to form a wet-stator arrangement enabling the pumped fluid to come into contact with the stator.

The objects assigned to the invention are achieved by means of a method for manufacturing a pump assembly according to the invention, characterized in that it comprises a step of manufacturing said removable seal jacket, during which a mandrel is coated with a primary material, then said primary material is subjected to a hardening process to form a rigid tube surrounding the mandrel, then said rigid tube is separated from the mandrel to form said seal jacket.

The objects assigned to the invention are finally reached using a method for installing a pump assembly according to the invention, characterized in that it comprises:

a testing step, during which said pump assembly in test configuration is used to pump water;

after the testing step, a step of removing said seal jacket from said casing to switch said pump assembly to the normal operating configuration;

after the step of removing said seal jacket, a step of implanting said pump assembly in normal operating configuration into a circuit for pumping an electrically non-conductive fluid.

BRIEF DESCRIPTION OF THE DRAWINGS

Other features and advantages of the invention will appear in more detail upon reading of the following description, with reference to the appended drawings, given by way of purely illustrative and non-limiting examples, in which.

BEST WAY TO IMPLEMENT THE INVENTION

Figure 1:
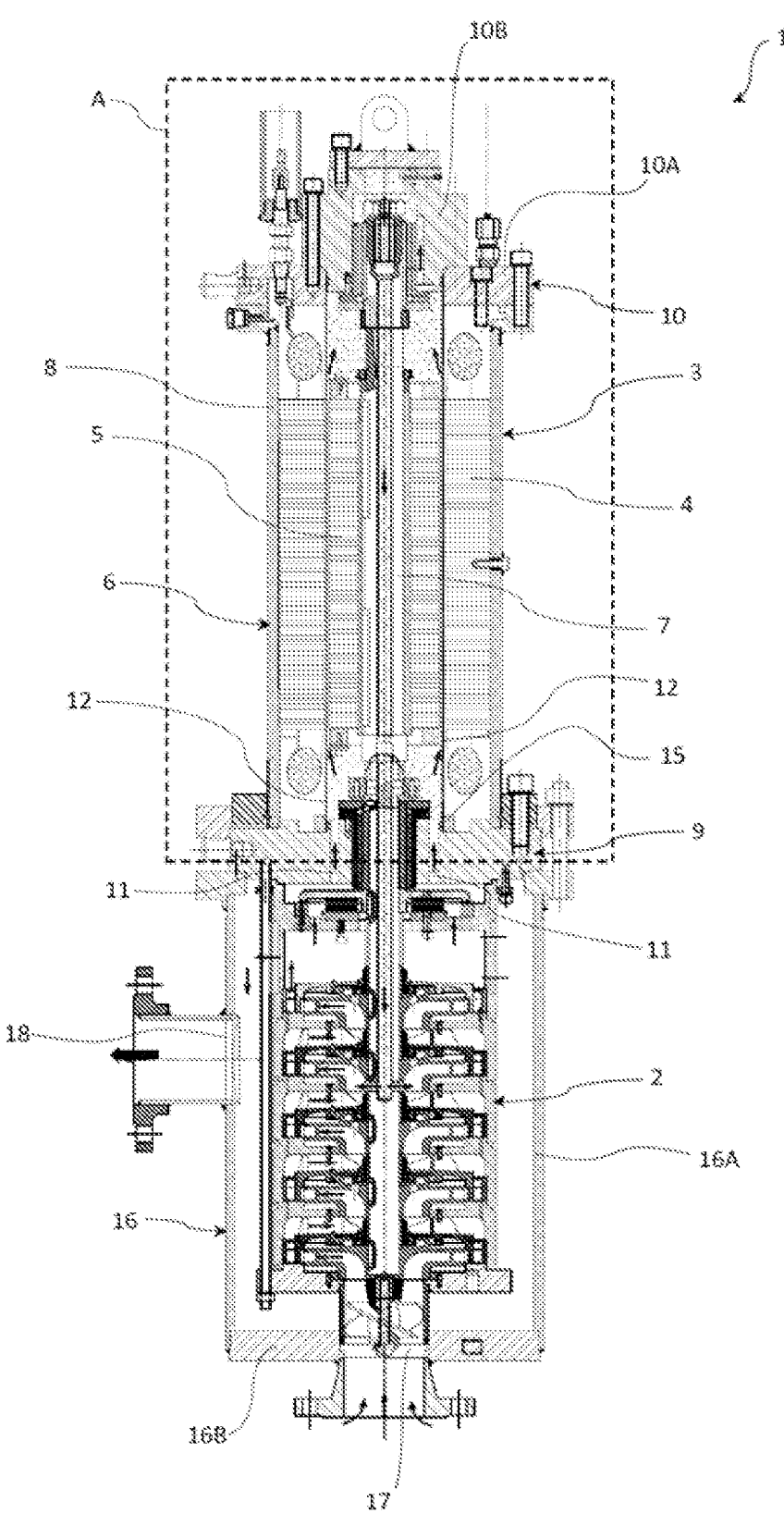
FIG. 1 illustrates, in a schematic longitudinal cross-sectional view, a pump assembly according to the invention that is in test configuration, the flows of pumped fluid being illustrated by arrows showing the path of the pumped fluid within the pump assembly, the fraction of pumped fluid used for cooling the motor being represented by speckled areas.
Figure 2:
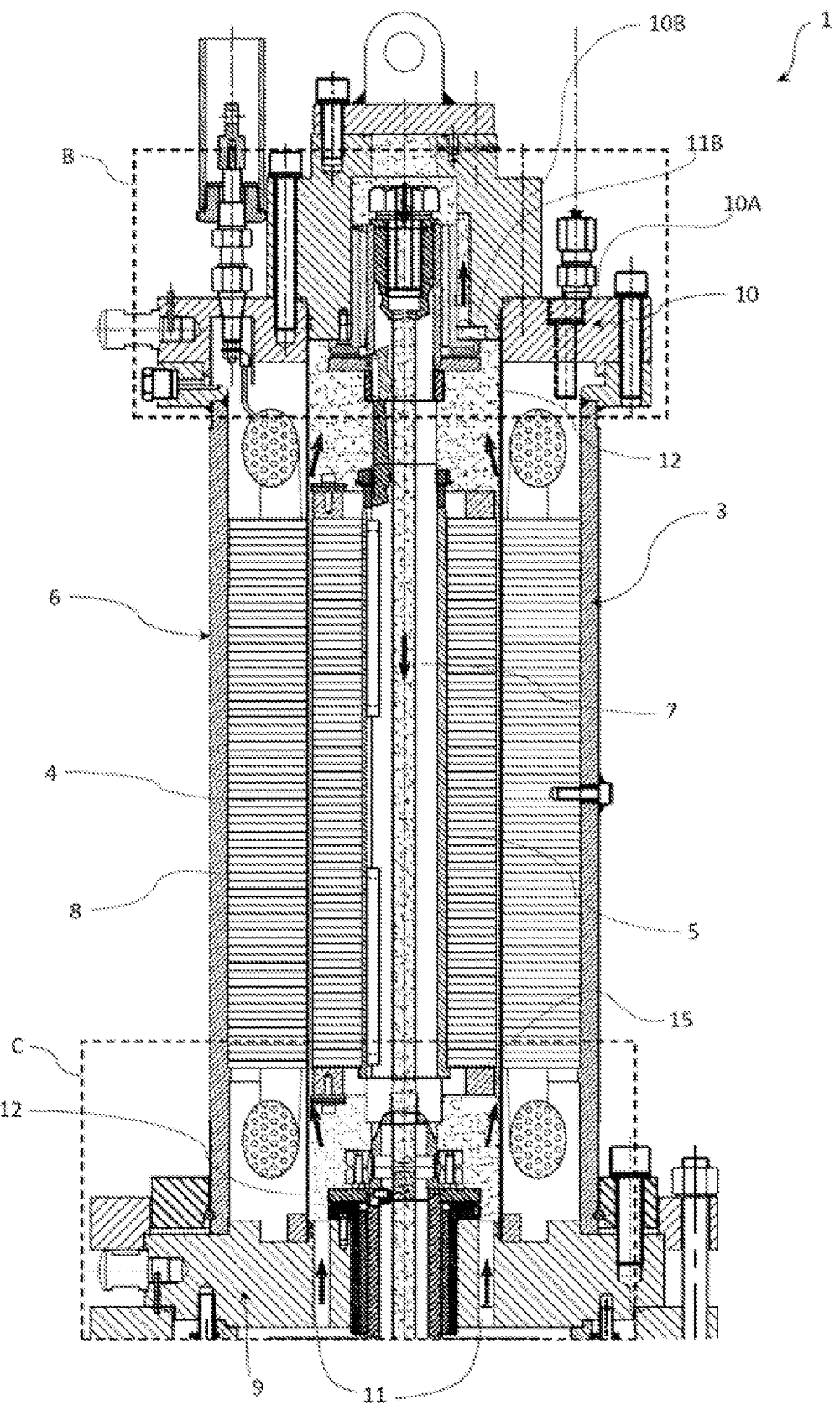
FIG. 2 is an enlarged view of the detail A of FIG. 1.
Figure 3:
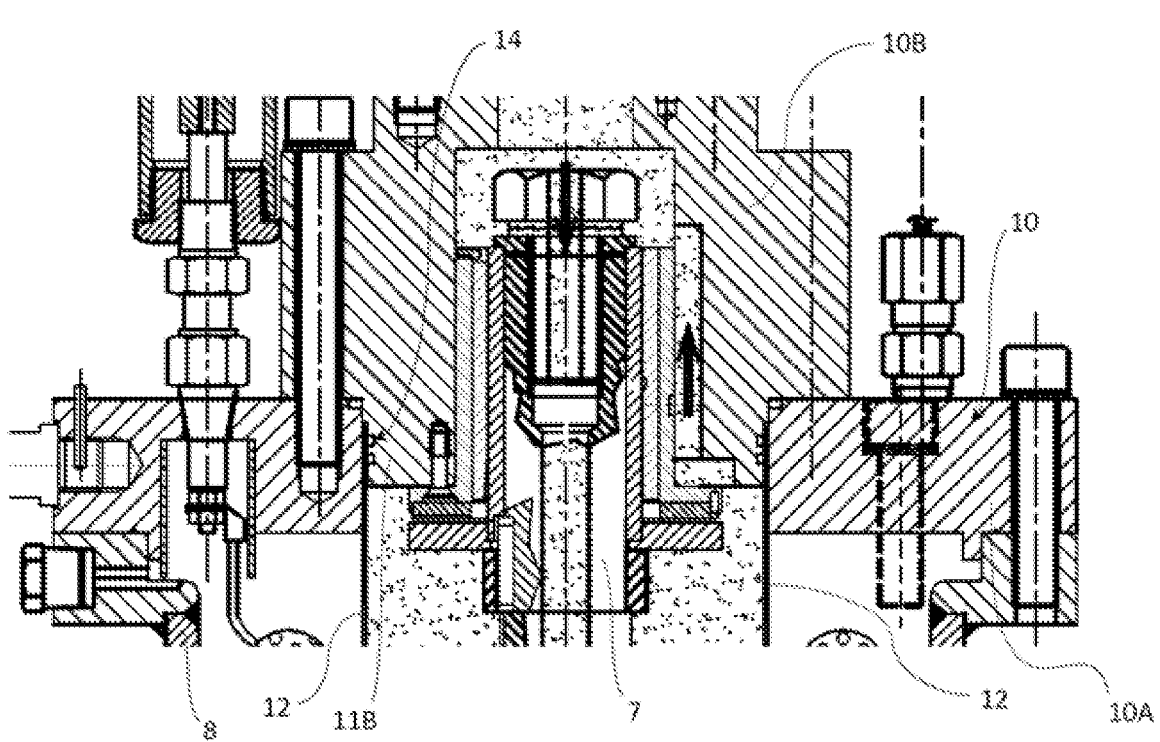
FIG. 3 is an enlarged view of the detail B of FIG. 2.
Figure 4:
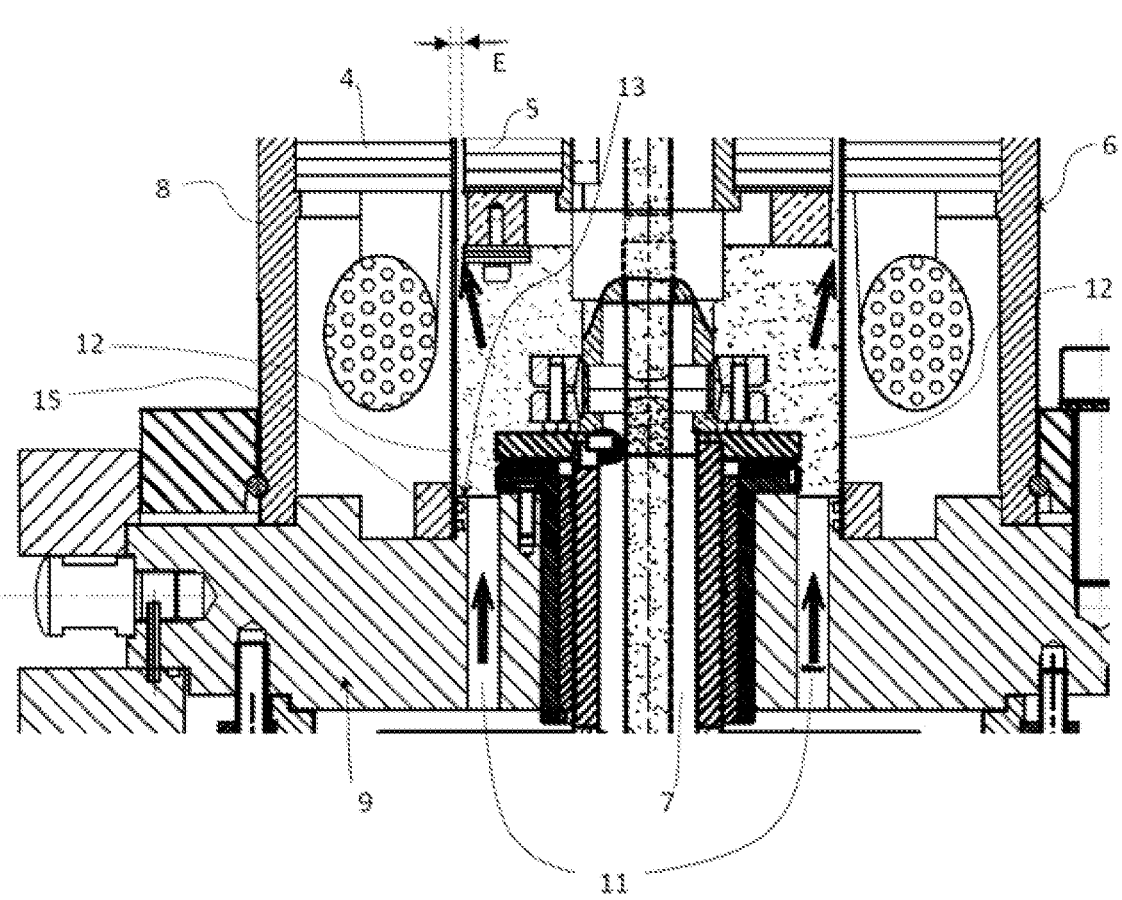
FIG. 4 is an enlarged view of the detail C of FIG. 2.

The invention relates to a pump assembly 1 for pumping fluids, and preferably electrically non-conductive fluids in the liquid state, such as liquefied petroleum gas.

The pump assembly 1 according to the invention thus advantageously forms a hydraulic pumping machine, preferentially consisted of a unitary assembly including a pump 2 and an electric motor 3 for driving said pump 2. The pump 2 may be of any suitable design, depending in particular on the nature of the fluid to be pumped, the pumping conditions and constraints, and the expected pumping performance. In an embodiment illustrated in the figures, the pump 2 is a multistage centrifugal pump, i.e. a multistage centrifugal pump for high-pressure pumping. The invention is however not limited to the implementation, within the pump assembly 1, of a multistage centrifugal pump, and it is perfectly conceivable that the pump 2 is for example alternatively formed by a traditional centrifugal pump, without thereby departing from the scope of the invention.

Preferentially, the pump assembly 1 (and thus the pump 2 that is part of it) is designed to pump, in normal operation, liquefied petroleum gas, such as for example methane, ethane or propane. In this preferential embodiment, which corresponds to that illustrated in the figures, the pump 2 is advantageously a centrifugal pump, preferentially of the multistage type, specifically adapted to the particular characteristics of the liquefied petroleum gases, in particular with regard to the following parameters:

high vapour pressure (VP) or low pressure difference between vapour pressure VP and suction pressure;

low available NPSH ("Net Positive Suction Head", i.e. the difference between the total absolute pressure of the liquid to be pumped and its saturation vapour pressure);

high suction pressure.

The motor 3 in the pump assembly 1 conventionally comprises a stator 4 and a rotor 5 separated from each other by a gap E. The stator 4 is designed to generate a magnetic field and includes for example for that purpose permanent magnets and/or electromagnets. Preferably, the stator 4 includes a wound magnetic iron core creating a rotating magnetic field. The stator 4 is advantageously arranged at the periphery of the motor 3, in such a way as to delimit a central space accommodating the rotor 5, which is then advantageously surrounded by the stator 4. The rotor 5 advantageously forms an induced-current rotor or a permanent-magnet rotor. The gap E corresponds to a free interstitial space existing between the stator 4 and the rotor 5, which allows the relative rotation of the stator 4 and the rotor 5, and also the circulation of the pumped fluid to cool the motor 3.

The pump assembly 1 also includes a casing 6 delimiting a housing accommodating said stator 4 and rotor 5. Advantageously, the casing 6 is tight (in particular fluid-tight, and preferably liquid-tight), and has an overall tubular shape with a circular cross-section. The stator 4 is mounted fixed to the housing 6, whereas the rotor 5 is movably mounted relative to the housing 6. The rotor 5 is advantageously attached to a drive shaft 7 so driven in rotation by the rotor 5. Said drive shaft 7 is itself connected to the pumping elements of the pump 2, e.g. one or more turbines, to drive them in rotation and thus ensure pumping of the fluid. Each turbine of the pump 2 is for example directly attached to the drive shaft 7 (in which case the latter extends beyond the casing 6 into the body of the pump 2), or is attached to a pump shaft distinct from the drive shaft 7 and connected to the latter, for example by means of a universal joint. Preferably, according to the embodiment illustrated in the figures, the pump 2 and the motor 3 are arranged coaxially to each other, i.e. the rotation axis of the rotor 5 (and of the drive shaft 7) and the rotation axis of the turbines of the pump 2 are advantageously merged together. In the particular embodiment illustrated in the figures, the pump assembly 1 is designed to operate in a vertical position, i.e. in normal operation the drive shaft 7 extends vertically, with the motor 3 advantageously located above the pump 2. The invention is however not limited to such an arrangement, and it is for example perfectly conceivable that the pump assembly 1 extends horizontally in normal operation, with the drive shaft 7 arranged horizontally, without thereby departing from the scope of the invention.

As illustrated in the figures, the housing formed by the casing 6 is in fluid communication with the pump 2 to circulate pumped fluid in said housing in order to cool the motor 3. In other words, the pump assembly 1 is designed to suck up fluid at an inlet of the pump 2 and to discharge it at an outlet of the pump 2, a fraction of the so-pumped fluid (corresponding to the speckled areas in the figures) entering the housing to come into contact with the active elements of the motor 3 in order to cool the latter. Advantageously, the casing 6 that accommodates the motor 3 comprises a tubular lateral frame 8 extending axially (longitudinally) between a first end and a second, opposite end. The casing 6 further advantageously comprises a first flange 9 that closes said lateral frame 8 at said first end, and a second flange 10 that closes said lateral frame 8 at said second end. The first flange 9 advantageously forms an interface between the pump 2 and the housing accommodating the stator 4 and the rotor 5. In order to ensure the above-mentioned fluid communication between said pump 2 and housing, the first flange 9 is advantageously provided with at least one through-passage 11 which allows a fraction of the pumped fluid to pass through the first flange 9 from the pump 2 to enter the housing and thus cool the motor 3. The first flange 9 and/or the second flange 10 are advantageously provided with means for guiding the drive shaft 7 (and the pump shaft, as the case may be), being for example in the form of bearings, journals and/or bushings for guiding the drive shaft 7 in rotation relative to the first flange 9 and/or the second flange 10.

Figure 5:
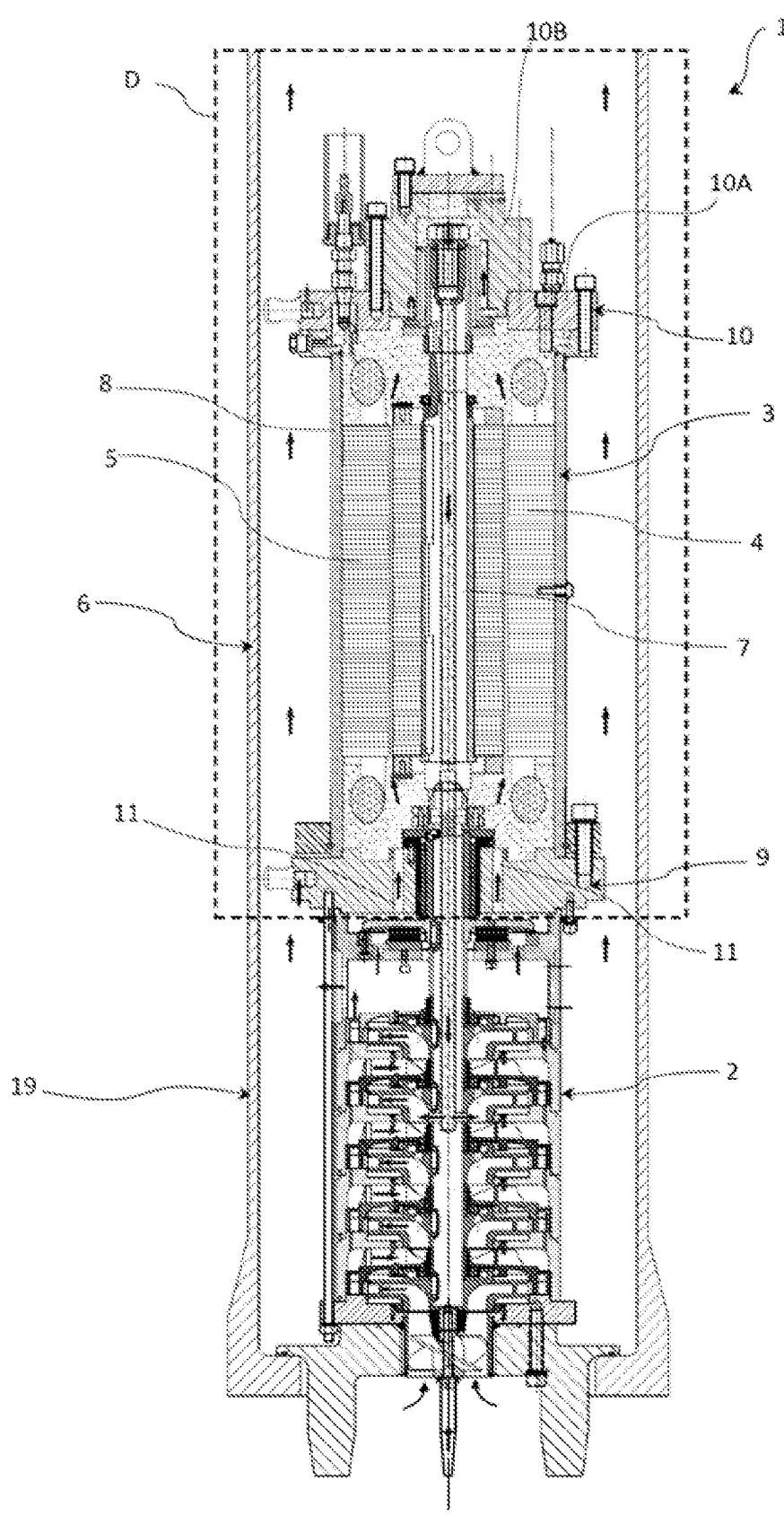
FIG. 5 illustrates, in a schematic longitudinal cross-sectional view, the pump assembly of FIGS. 1 to 4, which is now in normal operating configuration, the flows of pumped fluid being illustrated by arrows showing the path of the pumped fluid within the pump assembly, the fraction of pumped fluid used for cooling the motor being again represented by speckled areas.
Figure 6:
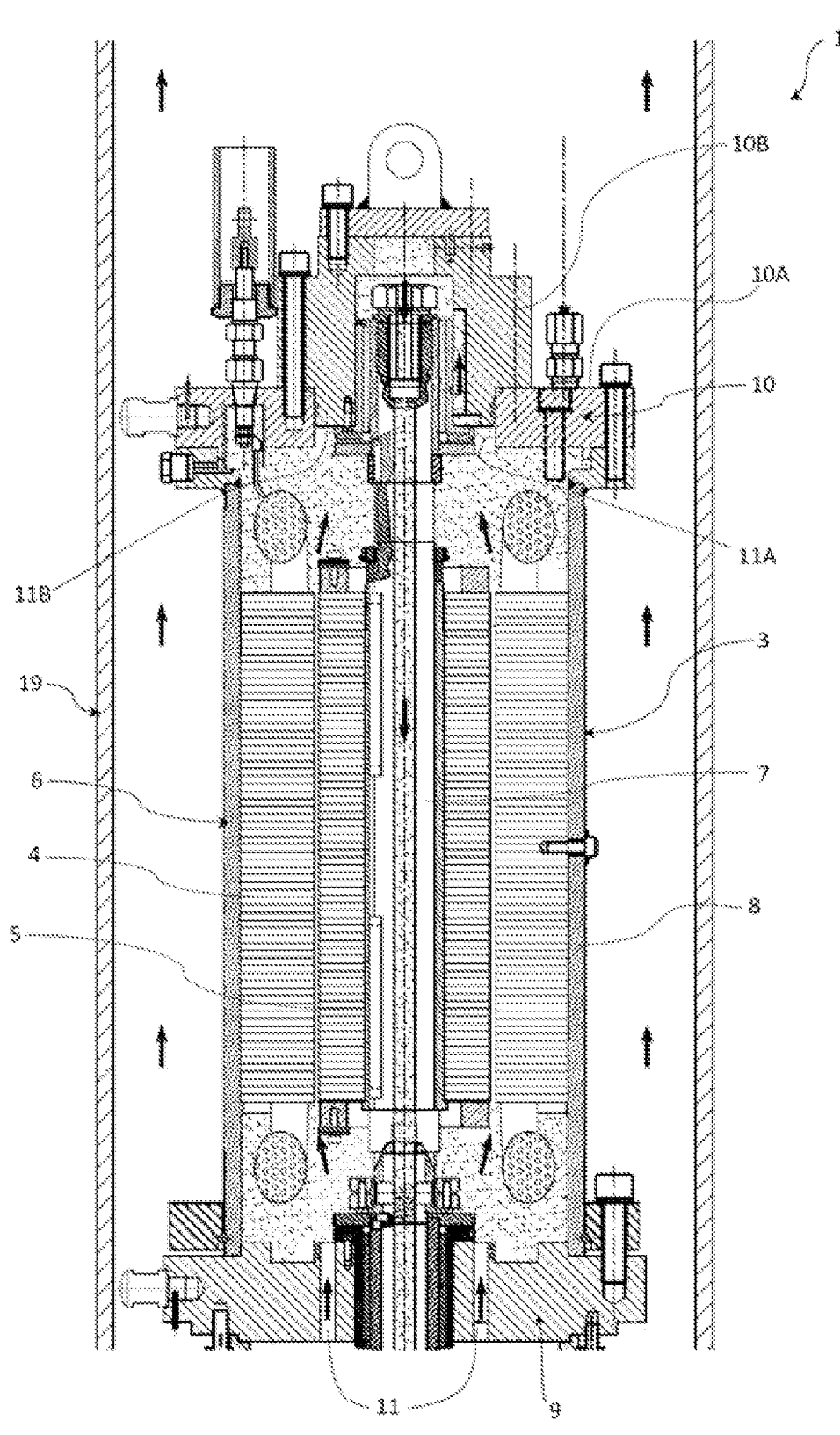
FIG. 6 is an enlarged view of the detail D of FIG. 5.

In accordance with the invention, the pump assembly 1 comprises a removable seal jacket 12 made of an electrically non-conductive material. Preferably, said seal jacket 12 includes a sleeve with a tubular wall, preferably of circular cross-section, and that advantageously extends, in the longitudinal direction, between two open ends. The pump assembly 1 is designed to switch:

from a test configuration (illustrated in FIGS. 1, 2, 3 and 4), in which said seal jacket 12 is removably mounted within the casing 6, in the gap E, to isolate said stator 4 from said pumped fluid circulating in the housing, to a normal operating configuration (illustrated in FIGS. 5 and 6), to pump electrically non-conductive fluid, in which the seal jacket 12 is removed from the casing 6, i.e. is suppressed from the pump assembly 1, in order to form a wet-stator arrangement enabling said pumped fluid to come into contact with the stator 4.

The test configuration is a provisional configuration, used to test the pump assembly 1, which, for this purpose, is temporarily in an isolated-stator arrangement (canned-stator arrangement), in such a way that the pumped fluid cannot come into contact with the stator 4 and the electric elements associated with the latter. Thanks to the presence of the seal jacket 12, it is therefore possible to subject the pump assembly 1 to trials and tests by pumping water. The electrically conductive nature of water does not hinder the tests, since the water cannot come into contact with the stator 4 and the electric elements associated thereto, thanks to the presence of the seal jacket 12 that forms a liquid-tight barrier. Once the tests performed, it is possible to switch the pump assembly 1 to its normal operating configuration by removing the seal jacket 12 from the casing 6. In its normal operating configuration, the pump assembly 1 forms a wet-stator pump assembly for pumping electrically non-conductive fluids (such as for example liquefied petroleum gas). In order to allow the pump assembly 1 to switch from one of said test and normal operating configurations to the other, the seal jacket 12 is removable by design, i.e. in the test configuration, it is reversibly assembled to the housing 6, with mechanical fastening means that are easily and quickly accessible. The seal jacket 12 is thus advantageously designed to be easily slid out of the casing 6 by disassembling only a minimum number of elements (e.g. two, more preferably only one) of the latter, without intense mechanical effort on either said seal jacket 12, the casing 6, said rotor 5 or said stator 4. Said element(s) is/are preferably specifically designed for easy disassembly from the rest of the casing 6. For example, the seal jacket 12 extends axially in test configuration, from the first flange 9 to the second flange 10, said seal jacket 12 being advantageously attached to said first flange 9 and to said second flange 10. Advantageously, the pump assembly 1 also includes removable gasket seals 13, 14 arranged between the seal jacket 12 and each of said first and second flanges 9, 10, to form in said housing a first liquid-tight compartment, within which is housed the stator 4. In other words, in test configuration, the seal jacket 12 partitions the housing accommodating the stator 4 and the rotor 5, in order to create two compartments separated from each other by a liquid-tight barrier, i.e. said first compartment enclosing the stator 4, and a second compartment accommodating the rotor 5. When the pump assembly 1 is used in test configuration, the pumped liquid (which is preferably water) enters and invades said second compartment accommodating the rotor 5, but cannot enter said first compartment accommodating the stator 4. The gasket seals 13, 14, which ensure a seal contact between the seal jacket 12 and the first and second flanges 9, 10, respectively, are for example formed by O-rings arranged in grooves formed in the first flange 9 and the second flange 10, respectively. The O-rings in question are intended to be removed to switch from the test configuration to the normal operating configuration, in which they become useless in the absence of the seal jacket 12.

Preferably, as illustrated in the figures, the second flange 10 is formed of several portions, with a plate 10A attached to the lateral frame 8, said plate 10A having advantageously a central hole closed by a plugging part 10B that preferentially receives means for guiding the drive shaft 7. The plugging part 10B has advantageously a portion 11B of reduced cross-section intended to be inserted into said central hole formed in the plate 10A. In test configuration, the seal jacket 12 is advantageously wedged between, on the one hand, the lateral edge 11A of the central hole formed through the plate 10A, and on the other hand, said portion 11B of reduced cross-section of the plugging part 10B, said portion 11B carrying one or several grooves accommodating O-rings forming a first gasket seal 14. The first flange 9 preferably comprises a docking portion with a cross-section matching that of the seal jacket 12, said seal jacket 12 advantageously surrounding said docking portion from the outside in test configuration. Advantageously, said passages 11 formed through the first flange 9 pass through said docking portion, as illustrated in the figures. Preferably, in order to locally stiffen the seal jacket 12, to avoid the deformation thereof under the effect of the pressure inside said second compartment accommodating the rotor 5, the pump assembly 1 comprises a stiffening ring 15 that locally surrounds the seal jacket 12, which is therefore interposed between the docking portion of the first flange 9 and the stiffening ring 15. The docking portion of the first flange 9 is advantageously provided with grooves that accommodate O-rings forming a second gasket seal 13 against which the seal jacket 12 rests. Thanks to the preferential presence of the stiffening ring 15, the seal contact between the seal jacket 12 and the gasket seal 14 is maintained in any circumstance, whatever the pressure level inside the second compartment that accommodates the rotor 5 in test configuration. Thanks to the preferential arrangement illustrated in the figures and described hereinabove, the seal jacket 12 can be easily disassembled. For that purpose, it is simply necessary to remove the plugging part 10B (which is for example bolted to the plate 10A) then to axially pulling the seal jacket 12 out of the gap E and the casing 6. In the case where a stiffening ring 15 is implemented, it may be necessary to disassemble also the first flange 9 in order to separate it from the lateral frame 8 and to therefore gain access to the stiffening ring 15. Therefore, a portion of the casing 6 can also be disassembled (and reassembled), so that a minimum effort is necessary to remove the seal jacket 12 from the casing 6. Preferably, to extract the seal jacket 12 from the casing 6, it is simply necessary to disassemble a maximum of two seal elements of the casing 6 (for example, only the plugging part 10B and the first flange 9 have to be disassembled). According to a particular embodiment, to extract the seal jacket 12 from the casing 6, it is simply necessary to disassemble only one seal element of the casing 6 (for example, only the plugging part 10B has to be disassembled). Said element(s) is/are preferably specifically designed for easy disassembly from the rest of the casing 6, and for just as easy reassembly to the rest of the casing 6. Advantageously, the pump assembly 1 forms a wet-rotor arrangement, both in its test configuration and in its normal operating configuration. In other words, the pump assembly 1 is advantageously not provided with any means for isolating the rotor 5 from the pumped fluid, both in the test configuration and in the normal operating configuration. Therefore, in the normal operating configuration, the pump assembly 1 is a submerged-rotor-and-stator pump assembly, i.e. the rotor 5 and the stator 4 are both brought into contact with pumped fluid to ensure cooling of the motor 3. Such a design enables to reduce maintenance and risks of leakage, and to ensure a high degree of safety, particularly when pumping liquefied petroleum gases, while benefiting from a simplified construction with a minimum number of internal sealing parts. The stator 4 is in particular advantageously designed to be able (in normal operating configuration) to be submerged in a fluid, preferably an electrically non-conductive fluid (for example, liquefied petroleum gas). The casing 6 is preferentially designed to be fluid-tight (and in particular to the pumped fluid, e.g. liquefied petroleum gas), and in particular, the pump assembly 1 is advantageously designed so that said lateral frame 8 is (in normal operating configuration) in direct contact with the pumped fluid. Preferentially, this is the casing 6 that seals the pump assembly 1 against the pumped fluid and not the seal jacket 12 (at least in normal operating configuration). The casing 6, even without the seal jacket 12, is thus advantageously designed to form a housing that is fluid-tight, of course except the passage(s) 11 that allow the fluid to enter the pump 2. Said sealed housing is preferentially intended to be filled with the pumped fluid. Said pump assembly 1 is therefore preferentially designed so as not to include, within said fluid-tight housing, any element sensitive to the pumped fluid liable to be brought into contact with the latter when said assembly 1 is in normal operating configuration, i.e. when the seal jacket 12 has been removed. Said fluid-tight housing preferably contains both the stator 4 and the rotor 5. Moreover, the casing 6, even without the seal jacket 12, is preferentially designed to form a housing resisting to the pumped fluid pressure (in particular at said lateral frame 8).

Advantageously, the drive shaft 7 is pierced axially by a longitudinal channel through which pumped fluid can circulate. Therefore, the pumped fluid can enter said housing by passing through the passages 11 formed through the first flange 9, then circulate in the housing, in particular in the gap E between the stator 4 and the rotor 5, to then enter said channel at an upper inlet located at the top of the drive shaft 7, said top being for example housed in the plugging part 10B, as illustrated. The pumped fluid then circulates inside the drive shaft 7 in said channel, until it reaches an outlet leading into the pump 2, as illustrated in the figures.

Advantageously, the pump assembly 1 also comprises a removable test envelope 16 that, in test configuration, is removably attached to the casing 6 to delimit a pumping compartment within which said pump 2 is housed. Said test envelope 16 is for example attached to the first flange 9, as illustrated in the figures. The test envelope 16 preferentially comprises a tubular lateral wall 16A, which surrounds the pump 2 and extends between an end removably attached to the first flange 9 and an opposite end, advantageously closed by a bottom 16B. The test envelope 16 is assembled in a removable, reversible way, to the casing 6, and more precisely to the first flange 9, in such a way as to be able to switch from the test configuration to the normal operating configuration by suppression of the test envelope 16, which is that way detached from the casing 6 in the normal operating configuration. Advantageously, the test envelope 16 is provided with at least two openings 17, 18 forming a fluid suction inlet and a fluid discharge outlet, respectively, between which the pumped fluid is intended to circulate within said pumping compartment. For example, the fluid suction inlet opening 17 is formed through the bottom 16B, whereas the fluid discharge outlet opening 18 is formed through the lateral wall 16A, as illustrated in the figures. Thanks to the test envelope 16, it is possible to connect, at the fluid suction inlet opening 17, the pump assembly 1 (in test configuration) to a water supply circuit, to test the pump assembly 1. The water will thus be sucked up by the pump 2 and will invade the pumping compartment delimited by the test envelope 16, therefore submerging the pump 2 that will deliver part of the pumped water flow into the housing accommodating the motor 3, in order to create a circulation only inside the second compartment delimited by the seal jacket 12 and that contains the rotor 5. The water will thus circulate up to the top of the drive shaft 7, into which it will penetrate, before being brought back to the pump 2, as illustrated by FIG. 1, the pumped water being discharged out of the pump assembly 1 through the fluid discharge outlet opening 18. The pump assembly 1 can then be tested in a particularly practical, fast and cost-effective way, without the need for a specialized test bench. Thereafter, once the tests performed, it is only necessary to remove the test envelope 16 and the seal jacket 12 (and the associated gasket seals 13, 14) to switch the pump assembly 1 to the normal operating configuration, for it to be able to pump an electrically non-conductive fluid, as for example liquefied petroleum gas.

Preferably, in test configuration, the seal jacket 12 is applied against the stator 4 in order to create a clearance, preferably as great as possible, between the seal jacket 12 and the rotor 5, which favours an optimum circulation of the pumped fluid in the gap E, and limits potential hydraulic and/or electrical disturbances that could affect the representativeness of the tests.

Preferably, the thickness of the tubular wall forming the sleeve of the seal jacket 12 is advantageously between 0.3 and 1.2 mm, the aim being to achieve the smallest possible thickness, without sacrificing mechanical strength and tightness, in order to leave sufficient space in the gap E to enable the fluid to circulate, and to limit here again potential hydraulic and/or electrical disturbances that could affect the representativeness of the tests.

Advantageously, the electrically non-conductive material from which the seal jacket 12 is made has a high electrical resistivity. This enables to significantly reduce eddy-current losses in the gap due to the rotating magnetic field and that could affect the representativeness of the tests.

Advantageously, the electrically non-conductive material used to form the seal jacket 12 is a composite material comprising, on the one hand, a polymer matrix and, on the other hand, reinforcing fibres embedded in said matrix. The use of such a composite material provides an excellent compromise between electrically non-conductive properties on the one hand, and rigidity and mechanical strength on the other hand. It is indeed necessary that the seal jacket 12 can resist to high pressures (e.g. of the order of 20 bars or more) without being deformed, or at least by keeping a low enough deformation level not to break the sealing contact between the seal jacket 12 and the gasket seals 13, 14. The electrically non-conductive material used to form the seal jacket 12 thus advantageously comprises plastic (i.e. one or more polymers). Said plastic preferably forms, in weight, more than 40%, more preferentially more than 50%, of the total mass of the material, the remaining being for example formed by said reinforcing fibres. The interest to use plastic (preferably, reinforced with embedded reinforcing fibres as mentioned hereinabove) in the material used to form the seal jacket 12 is, besides the already-mentioned electrically non-conductive properties, that said seal jacket 12 can be easily removed without damaging the stator 4, the rotor 5, or any other important component inside the casing 6. Advantageously, said seal jacket 12 is not made of metal, and more advantageously it comprises no metal, i.e. no metallic element with a significant mass relative to the total mass of the seal jacket 12 (e.g., a significant mass would be higher than or equal to 1%, preferably 0.1%). Said seal jacket 12 is preferably not made of steel, and it advantageously contains no iron. A steel jacket (or made of another metal) would not suit in a test configuration, because it would be electrically conductive, and it would risk damaging important components within said housing 6 when removing said seal jacket 12 to switch the pump assembly 1 from the test configuration to the normal operating configuration.

Particularly preferentially, the polymer forming said matrix belongs to the polyaryletherketone family, and is for example consisted of polyetheretherketone (PEEK), or belongs the polyimide family, whereas the reinforcing fibres are chosen in the group of carbon fibres, glass fibres and aramid fibres. Using such materials enable to obtain in particular the following characteristics and advantages:

high electrical resistivity, in order to avoid the eddy-current losses;
perfect water-tightness;
high mechanical strength to support significant pressures;
low sleeve thickness to avoid unduly disturbing the flow of pumped fluid in the gap E between the rotor 5 and the stator 4;
high-precision manufacturing to ensure perfect fit on the stator 4 and maximum clearance with the rotor 5.

The various technical measures described above for the manufacturing of the seal jacket 12 advantageously enable not only to prevent water from coming into contact with the electrical windings and the various electrical connections of the stator 4, but also to minimize damage to the mechanical, electrical and hydraulic characteristics of the pump assembly 1, so that the mechanical, electrical and hydraulic behaviour of the pump assembly 1 in test configuration is representative of the pump assembly 1 behaviour in normal operating configuration.

The invention moreover relates as such to a method for manufacturing a pump assembly 1 according to the invention, and which is for example as described hereinabove. The above description thus applies to the manufacturing method of the invention. Reciprocally, the following description of the manufacturing method also applies to the pump assembly 1 as such.

In accordance with the invention, the method for manufacturing the pump assembly 1 comprises a step of manufacturing the seal jacket 12, during which a mandrel is coated with a primary material, consisted for example of components and/or precursors of said electrically non-conductive material of the jacket 12. Then, said primary material is subjected to a hardening process to form a stiff tube surrounding the mandrel. Said stiff tube is then separated from the mandrel to form said seal jacket 12. Preferably, the primary material comprises reinforcing fibres, e.g. carbon fibres, which are wound around the mandrel. The primary material also comprises a polymer or a polymer precursor in fluid state (e.g. PEEK or a precursor thereof), intended to form the matrix, with which is coated the mandrel covered with fibres. The sub-set formed by the mandrel covered with fibres and coated with polymer (e.g. PEEK) is then subjected to a hardening and/or crosslinking process, which leads to the formation of a stiff tube made of a composite material (preferentially, PEEK matrix reinforced with carbon fibres), threaded onto the chuck. Said rigid tube is then separated from the mandrel and thus forms the seal jacket 12 ready to be installed into the pump assembly 1 in the test configuration.

The invention finally relates as such to a method for installing a pump assembly 1 according to the invention, and which is for example as described hereinabove. The description of the pump assembly 1 therefore applies to the installation method and vice versa.

Said installation method comprises a testing step, during which the pump assembly 1 in test configuration is used to pump water.

The method comprises, after the testing step, a step of removing the seal jacket 12 from the casing 6 to switch the pump assembly 1 to the normal operating configuration. This step of removing the seal jacket 12 is advantageously accompanied by a step of removing the test envelope 16 and/or the gasket seal 13, 14, and as the case may be, the ring 15.

Then, the installation method comprises, after the step of removing the seal jacket 12 (and, as the case may be, removing the test envelope 16 and/or the gasket seals 13, 14, and as the case may be, the ring 15), a step of implanting the pump assembly 1 in normal operating configuration into a circuit for pumping an electrically non-conductive fluid, e.g. liquefied petroleum gas, such as methane, ethane or propane.

For that purpose, the pump assembly 1 in normal operating configuration is for example associated with a case 19 that surrounds said pump assembly 1 over at least all its height. Said case 19 forms a compartment that not only accommodates the pump assembly 1 but also contains and channels the fluid discharged by the pump 2, so that said pump 2 and motor 3 are immersed within the pumped fluid inside said case 19.

POSSIBILITIES OF INDUSTRIAL APPLICATION

The invention find industrial application in the design, manufacturing and use of pump assemblies.

The invention claimed is:

1. A pump assembly (1) for pumping fluids, including a pump (2) and an electric motor (3) to drive the pump (2), said motor (3) comprising a stator (4) and a rotor (5) separated by a gap (E), said pump assembly also including a casing (6) delimiting a housing accommodating said stator (4) and rotor (5), said housing being in fluid communication with the pump (2) to circulate the pumped fluid in said housing in order to cool said motor (3), said pump assembly (1) being characterized in that it comprises a removable seal jacket (12) made of an electrically non-conductive material, and in that it is designed to switch from a test configuration, in which said seal jacket (12) is removably mounted within the casing (6), in the gap (E), to isolate said stator (4) from said pumped fluid, to a normal operating configuration, for pumping electrically non-conductive fluids, wherein the seal jacket (12) is removed from the casing (6), so as to form a wet-stator arrangement enabling the pumped fluid to come into contact with the stator (4).

2. The pump assembly (1) according to claim 1, characterized in that said electrically non-conductive material is a composite material comprising a polymer matrix and reinforcing fibres embedded in said matrix.

3. The pump assembly (1) according to claim 2, characterized in that said polymer belongs to the polyaryletherketone family or the polyimide family, whereas said reinforcing fibres are chosen in the group of carbon fibres, glass fibres, aramid fibres.

4. The pump assembly (1) according to claim 1, characterized in that, in test configuration, said seal jacket (12) is applied against said stator (4) in order to create a clearance between said seal jacket and the rotor (5).

5. The pump assembly (1) according to claim 1, characterized in that said seal jacket (12) includes a sleeve with a tubular wall, having a thickness between 0.3 and 1.2 mm.

6. The pump assembly (1) according to claim 1, characterized in that said casing (6) comprises a tubular lateral frame (8) extending axially between a first end and a second end, a first flange (9) that closes said lateral frame (8) at said first end, and a second flange (10) that closes said lateral frame (8) at said second end, said first flange (9) forming an interface between said pump (2) and said housing, said seal jacket (12) extending axially, in test configuration, from said first flange (9) to said second flange (10), said pump assembly (1) including removable gasket seals (13, 14) arranged between the seal jacket (12) and each of said first and second flanges (9, 10) to form in the housing a liquid-tight compartment within which is housed said stator (4).

7. The pump assembly (1) according to claim 6, characterized in that the first flange (9) comprises a docking portion with a cross-section matching that of the seal jacket (12), said seal jacket (12) advantageously surrounding said docking portion from the outside in test configuration.

8. The pump assembly (1) according to claim 7, characterized in that the pump assembly (1) comprises a stiffening ring (15) that locally surrounds the seal jacket (12), which is therefore interposed between the docking portion of the first flange (9) and the stiffening ring (15).

9. The pump assembly (1) according to claim 7, characterized in that the docking portion of the first flange (9) is provided with grooves that accommodate O-rings forming a second gasket seal (13) against which the seal jacket (12) rests.

10. The pump assembly (1) according to claim 6, characterized in that the second flange (10) is formed of several portions, with a plate (10A) attached to the lateral frame (8), said plate (10A) having a central hole closed by a plugging part (10B), the plugging part (10B) having a portion (11B) of reduced cross-section intended to be inserted into said central hole formed in the plate (10A), and wherein, in test configuration, the seal jacket (12) is wedged between the lateral edge (11A) of the central hole formed through the plate (10A), and said portion (11B) of reduced cross-section of the plugging part (10B), said portion (11B) carrying one or several grooves accommodating O-rings forming a first gasket seal (14).

11. The pump assembly (1) according to claim 1, characterized in that the pump assembly (1) comprises a removable test envelope (16) that, in test configuration, is removably attached to said casing (6) to delimit a pumping compartment within which said pump (2) is housed, said test envelope (16) being provided with at least two openings (17, 18) forming a fluid suction inlet and a fluid discharge outlet, respectively, between which the pumped fluid is intended to circulate within said compartment, said test envelope (16) being removed in normal operating configuration.

12. The pump assembly (1) according to claim 1, characterized in that said pump (2) is a multistage centrifugal pump.

13. The pump assembly (1) according to claim 1, characterized in that the pump assembly (1) is designed to pump liquefied petroleum gas.

14. A method for manufacturing a pump assembly (1) according to claim 1, characterized in that said method comprises a step of manufacturing said removable seal jacket (12), during which a mandrel is coated with a primary material, then said primary material is subjected to a hardening process to form a rigid tube surrounding the mandrel, then said rigid tube is separated from the mandrel to form said seal jacket (12).

15. A method for installing a pump assembly (1) according to claim 1, characterized in that said method comprises:

a testing step, during which said pump assembly (1) in test configuration is used to pump water;

after the testing step, a step of removing said seal jacket (12) from said casing (6) to switch said pump assembly (1) to the normal operating configuration;

after the step of removing said seal jacket (12), a step of implanting said pump assembly (1) in normal operating configuration into a circuit for pumping an electrically non-conductive fluid.

* * * * *